(12) United States Patent
Wakileh et al.

(10) Patent No.: US 7,676,136 B2
(45) Date of Patent: Mar. 9, 2010

(54) FIBER DISTRIBUTION HUBS WITH PATCH AND SPLICE ENCLOSURES

(75) Inventors: George I. Wakileh, Batavia, IL (US); Jerome A. Maloney, Sugar Grove, IL (US); Eduardo Leon, Woodridge, IL (US)

(73) Assignee: Emerson Network Power, Energy Systems, North America, Inc., Warrenville, IL (US)

( * ) Notice: Subject to any disclaimer, the term of this patent is extended or adjusted under 35 U.S.C. 154(b) by 0 days.

(21) Appl. No.: 12/215,254

(22) Filed: Jun. 26, 2008

(65) Prior Publication Data

US 2009/0324187 A1 Dec. 31, 2009

(51) Int. Cl.
*G02B 6/00* (2006.01)
(52) U.S. Cl. ........................ 385/135; 385/134
(58) Field of Classification Search .................. None
See application file for complete search history.

(56) References Cited

U.S. PATENT DOCUMENTS

| | | | |
|---|---|---|---|
| 4,595,255 A | 6/1986 | Bhatt et al. | |
| 4,971,421 A | 11/1990 | Ori | |
| 6,707,978 B2 * | 3/2004 | Wakileh et al. | ............. 385/134 |
| 6,760,531 B1 | 7/2004 | Solheid et al. | |
| 6,772,887 B2 | 8/2004 | Audibert et al. | |
| 6,777,617 B2 * | 8/2004 | Berglund et al. | ............. 174/92 |
| 6,792,191 B1 | 9/2004 | Clapp, Jr. et al. | |
| 6,909,833 B2 | 6/2005 | Henschel et al. | |
| 7,142,764 B2 | 11/2006 | Allen et al. | |
| 7,266,281 B1 | 9/2007 | Flatau | |
| 7,274,850 B2 | 9/2007 | Wittmeier et al. | |
| 2007/0183732 A1 | 8/2007 | Wittmeier et al. | |

FOREIGN PATENT DOCUMENTS

| | | |
|---|---|---|
| WO | 91/05281 | 4/1991 |
| WO | 02/103429 | 12/2002 |

* cited by examiner

*Primary Examiner*—Omar Rojas
(74) *Attorney, Agent, or Firm*—Harness, Dickey & Pierce, P.L.C.

(57) ABSTRACT

Fiber distribution hubs for distributing fiber optic networks are disclosed. The fiber distribution hub includes a mounting plate for supporting a termination of at least one fiber cable, a patch enclosure for protecting the termination, and a splice enclosure for protecting at least one splice connection to an optical fiber included in a feeder cable. The patch enclosure includes a first door and defining a patch chamber. The mounting plate is positioned within the patch chamber. The splice chamber includes a second door. The splice enclosure is releasably coupled to the patch enclosure.

13 Claims, 10 Drawing Sheets

FIBER DISTRIBUTION HUBS WITH PATCH AND SPLICE ENCLOSURES

FIELD

The present disclosure relates to fiber distribution hubs for use as distribution points in a fiber optic network.

BACKGROUND

The statements in this section merely provide background information related to the present disclosure and may not constitute prior art.

Fiber optic networks commonly include multiple distribution points for providing fiber optic continuity between a service provider and various customer locations. The distribution points typically include an interconnect cabinet. The interconnect cabinet encloses splice connections between feeder cables provided from the service provider, a splitter for dividing the light signal provided by the feeder cable between multiple fiber cables, and a patch panel permitting terminations between multiple fiber cables and drop cables to various customer locations. The interconnect cabinet is oftentimes installed on a rectangular concrete foundation measuring several feet in length and width and positioned over a fiber optic vault.

SUMMARY

According to one aspect of the present disclosure, a fiber distribution hub for distributing a fiber optic network is disclosed. The fiber distribution hub includes a mounting plate for supporting a termination of at least one fiber cable, a patch enclosure for protecting the termination, and a splice enclosure for protecting at least one splice connection to an optical fiber included in a feeder cable. The patch enclosure defines a patch chamber. The mounting plate is positioned within the patch chamber. The splice enclosure is releasably coupled to the patch enclosure.

According to another aspect of the present disclosure, a fiber distribution hub for distributing a fiber optic network includes a mounting plate for supporting a termination of at least one fiber cable, a patch enclosure for protecting the termination, and a splice enclosure for protecting at least one splice connection to an optical fiber included in a feeder cable. The patch enclosure includes a first door and defines a patch chamber. The mounting plate is positioned within the patch chamber. The splice chamber includes a second door. The splice enclosure is releasably coupled to the patch enclosure.

According to another aspect of the present disclosure, a method of using a fiber distribution hub for distributing a fiber optic network is disclosed. The fiber distribution hub includes a splice enclosure and a patch enclosure. The patch enclosure includes a mounting plate and a first door. The splice enclosure includes a second door. The method includes installing at least one optical fiber in the splice enclosure and releasably coupling the splice enclosure to the patch enclosure.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2A:
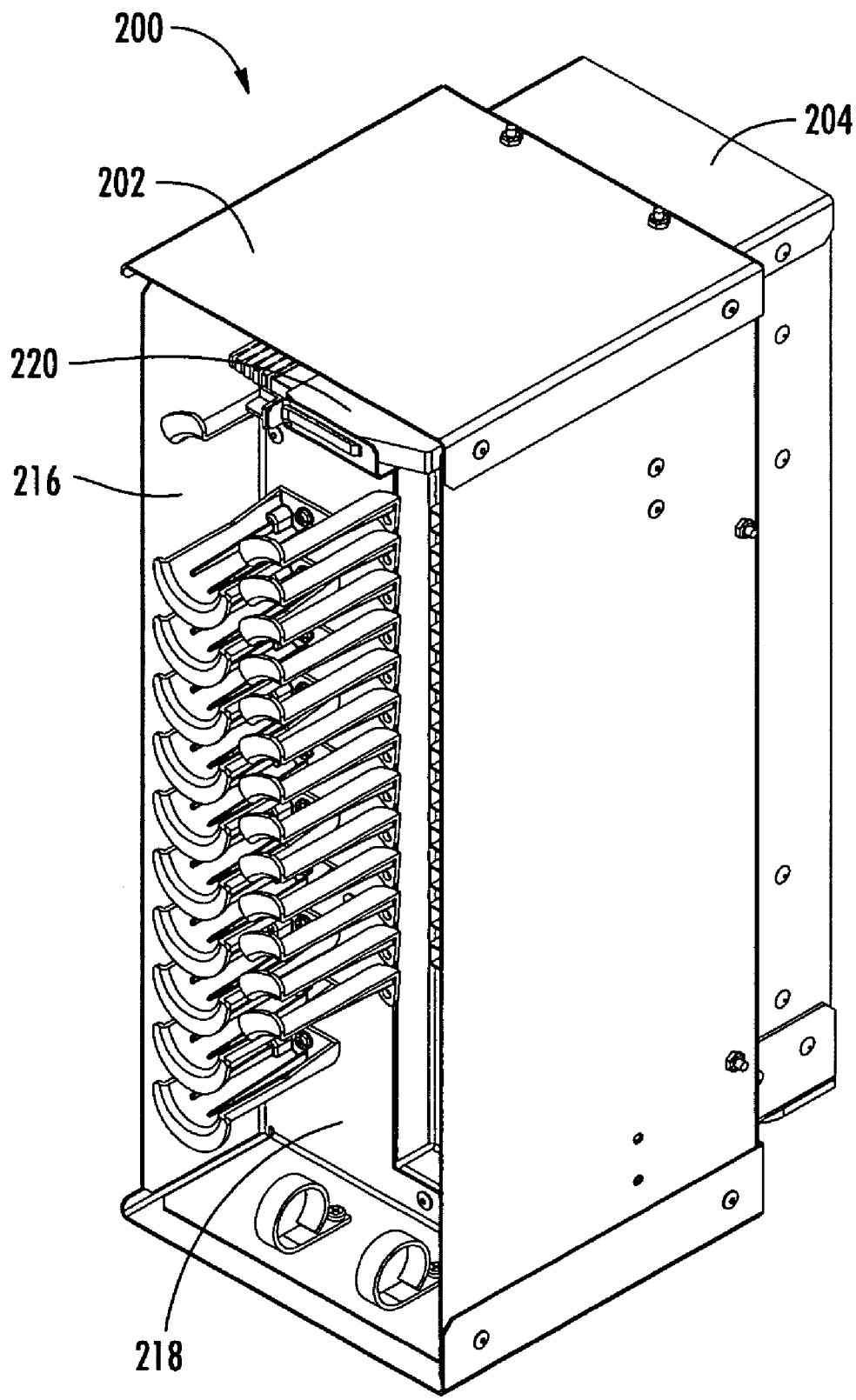
FIGS. 2A and 2B are internal perspective views of the splice enclosure and the patch enclosure of the fiber distribution hub of FIG. 1, when assembled.
Figure 2B:
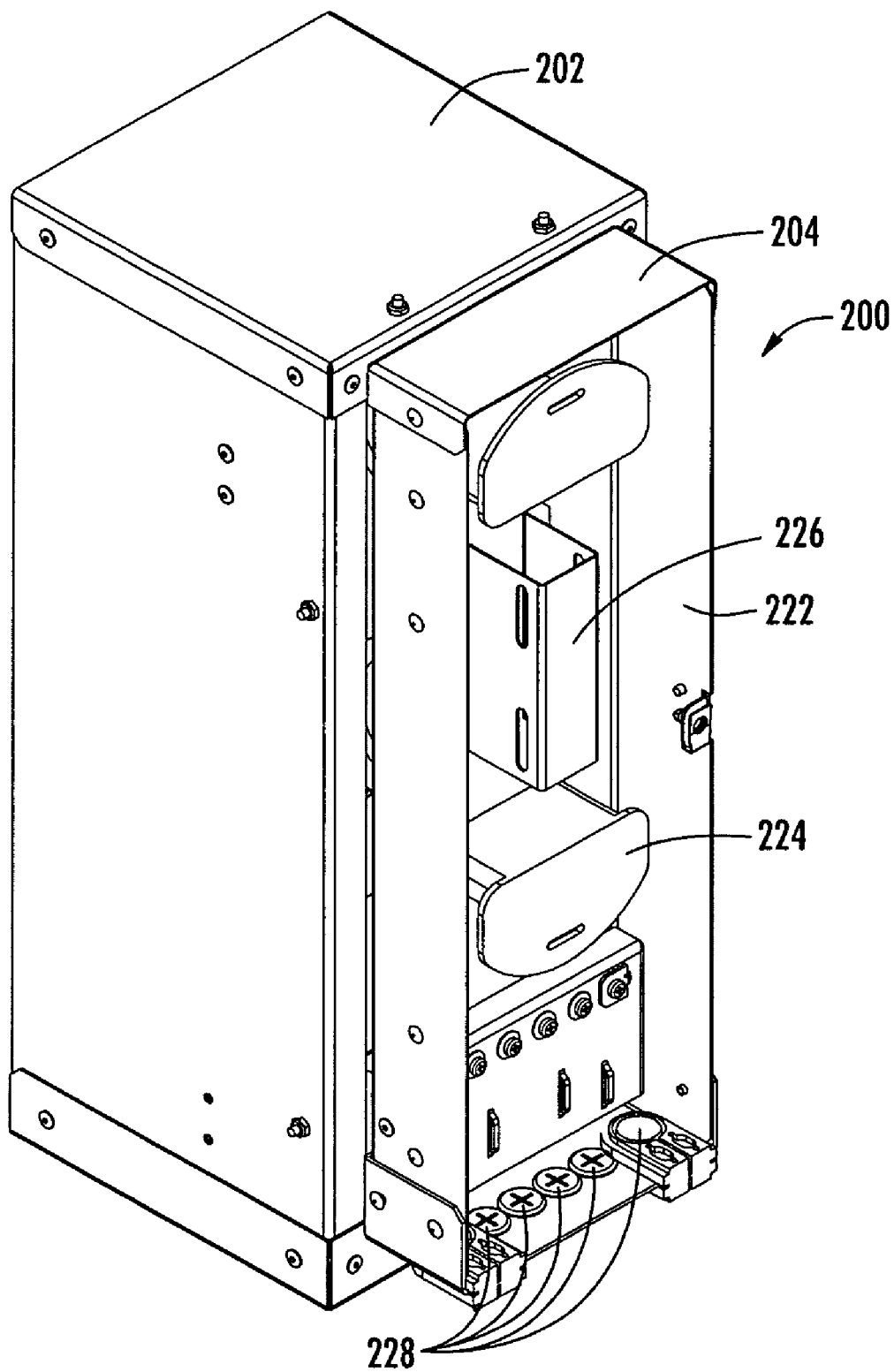
Figure 3A:
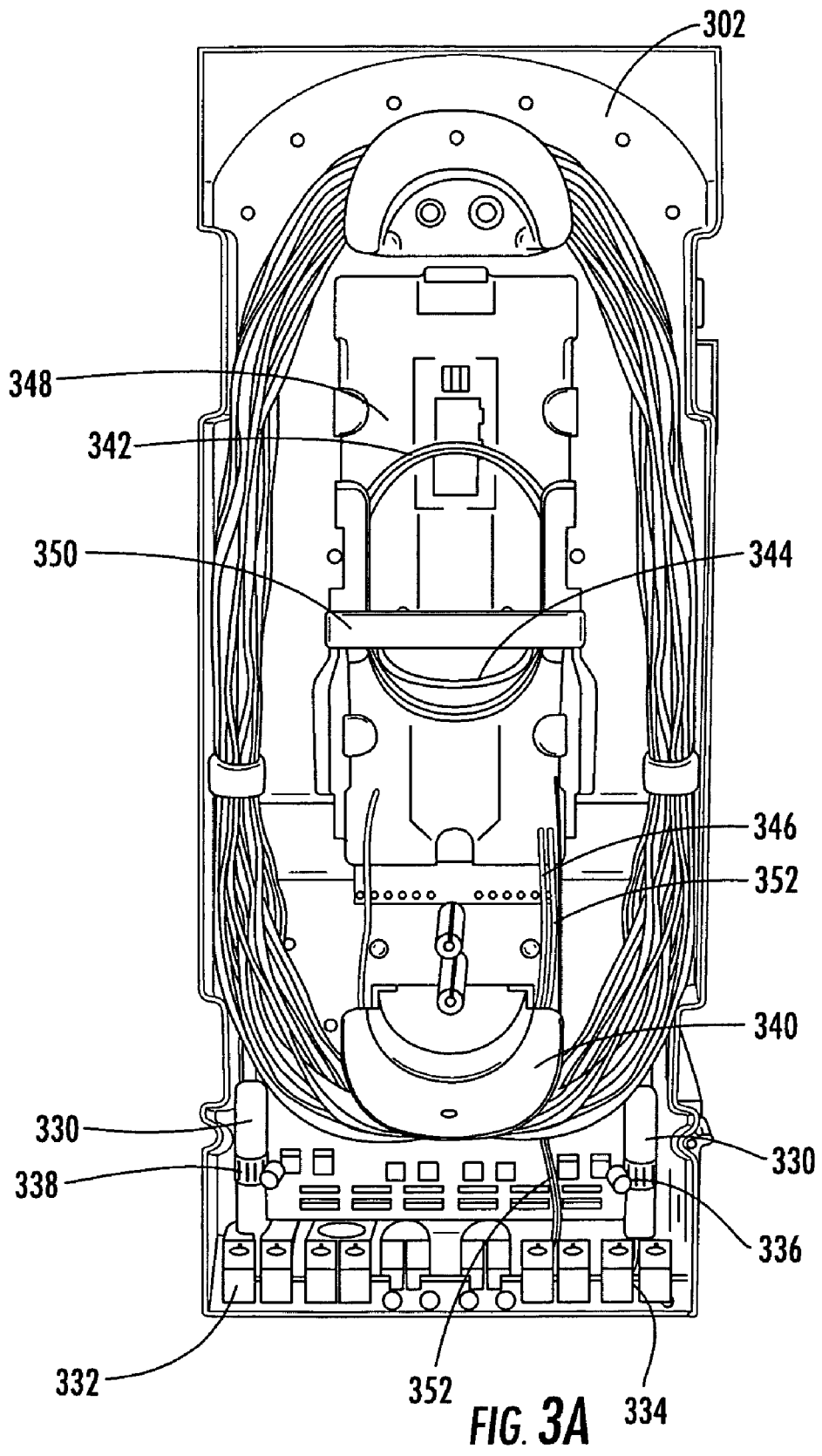
Figure 3B:
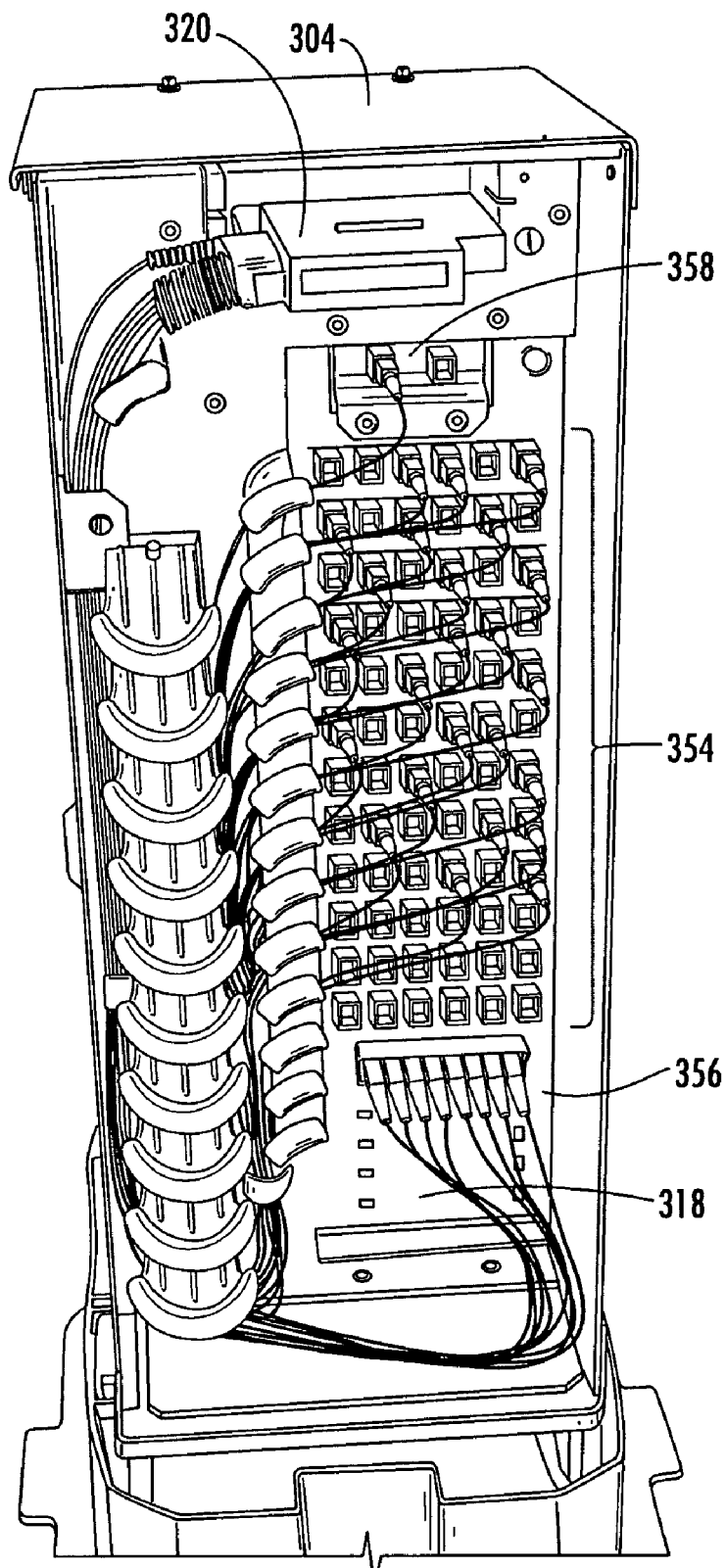
Figure 3C:
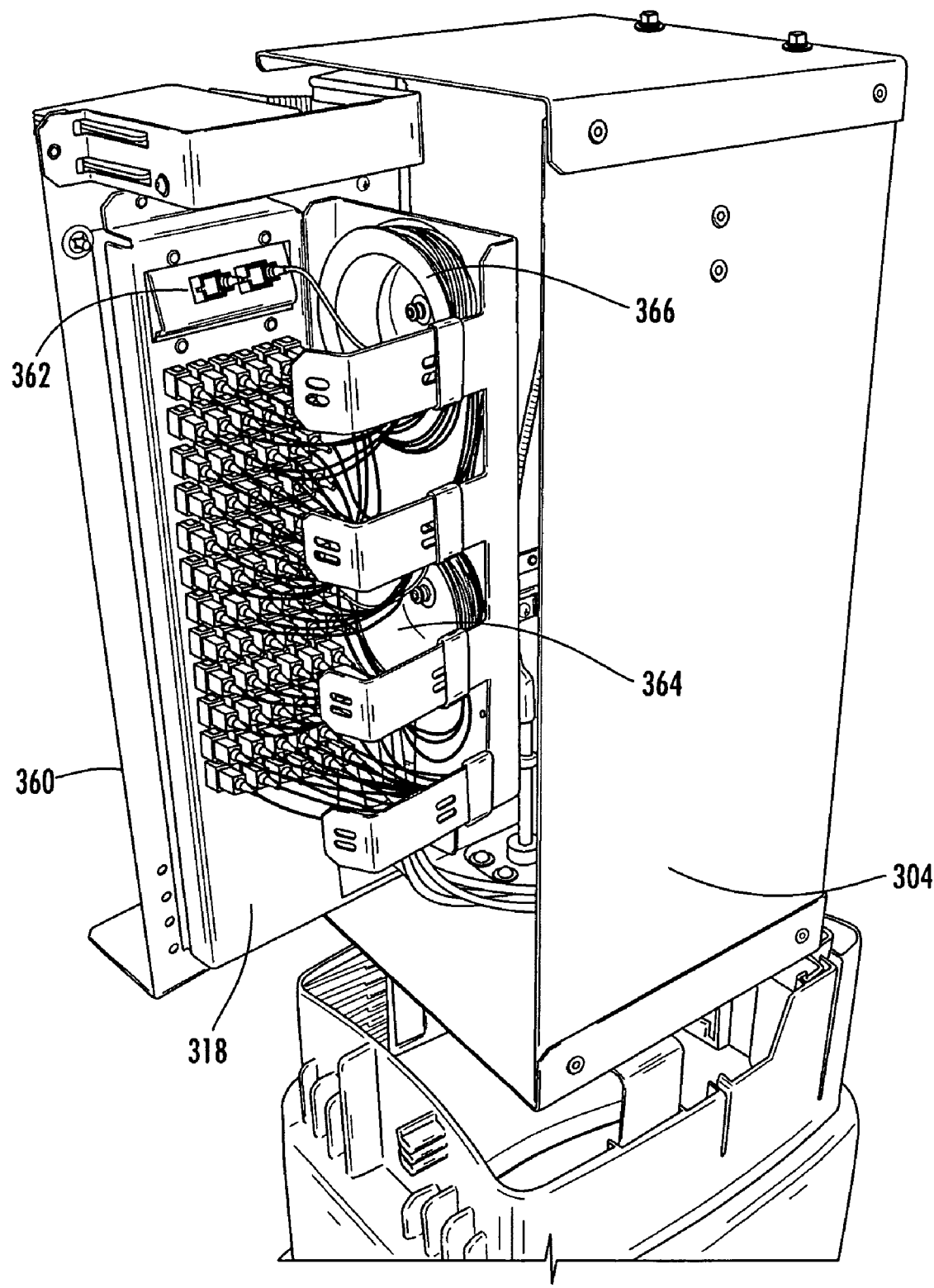

FIGS. 3A, 3B, and 3C are perspective views of fiber distribution hub of FIG. 2 with cables installed therein.

Figure 4:
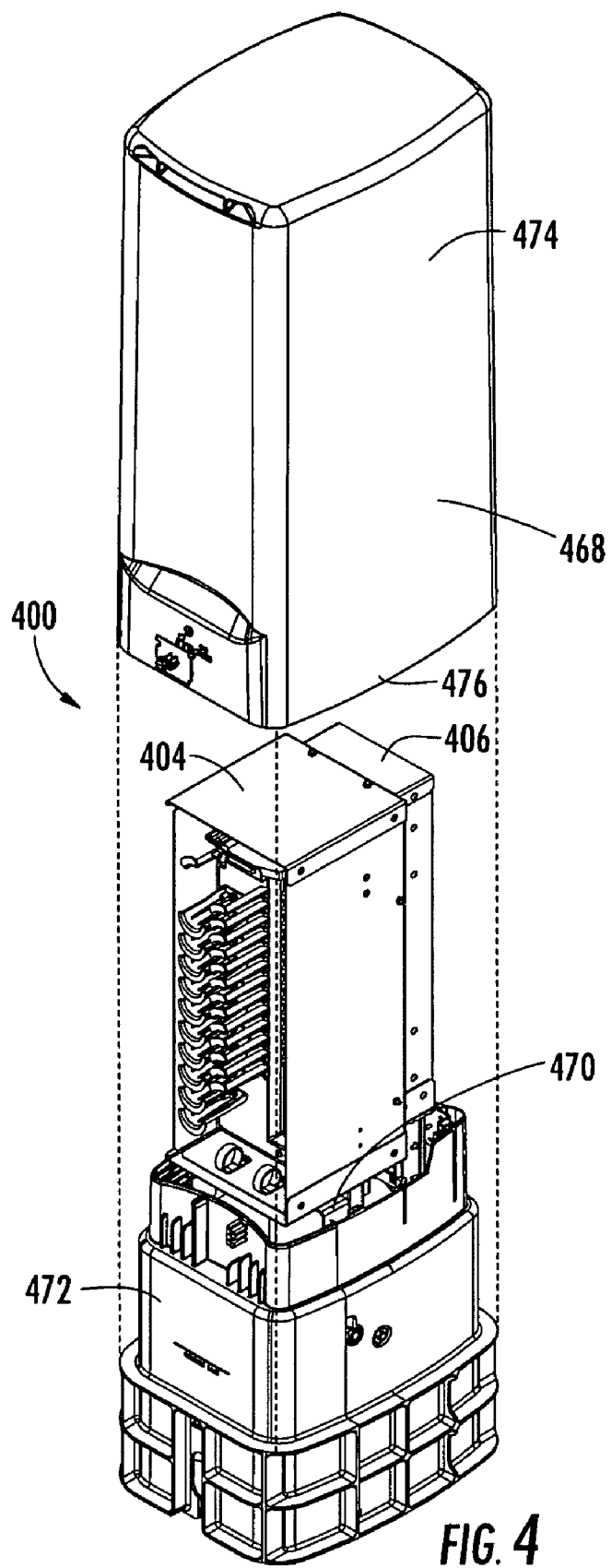

FIG. 4 illustrates an exploded view of a pedestal enclosure including the fiber distribution hub of FIG. 2.

Figure 5:
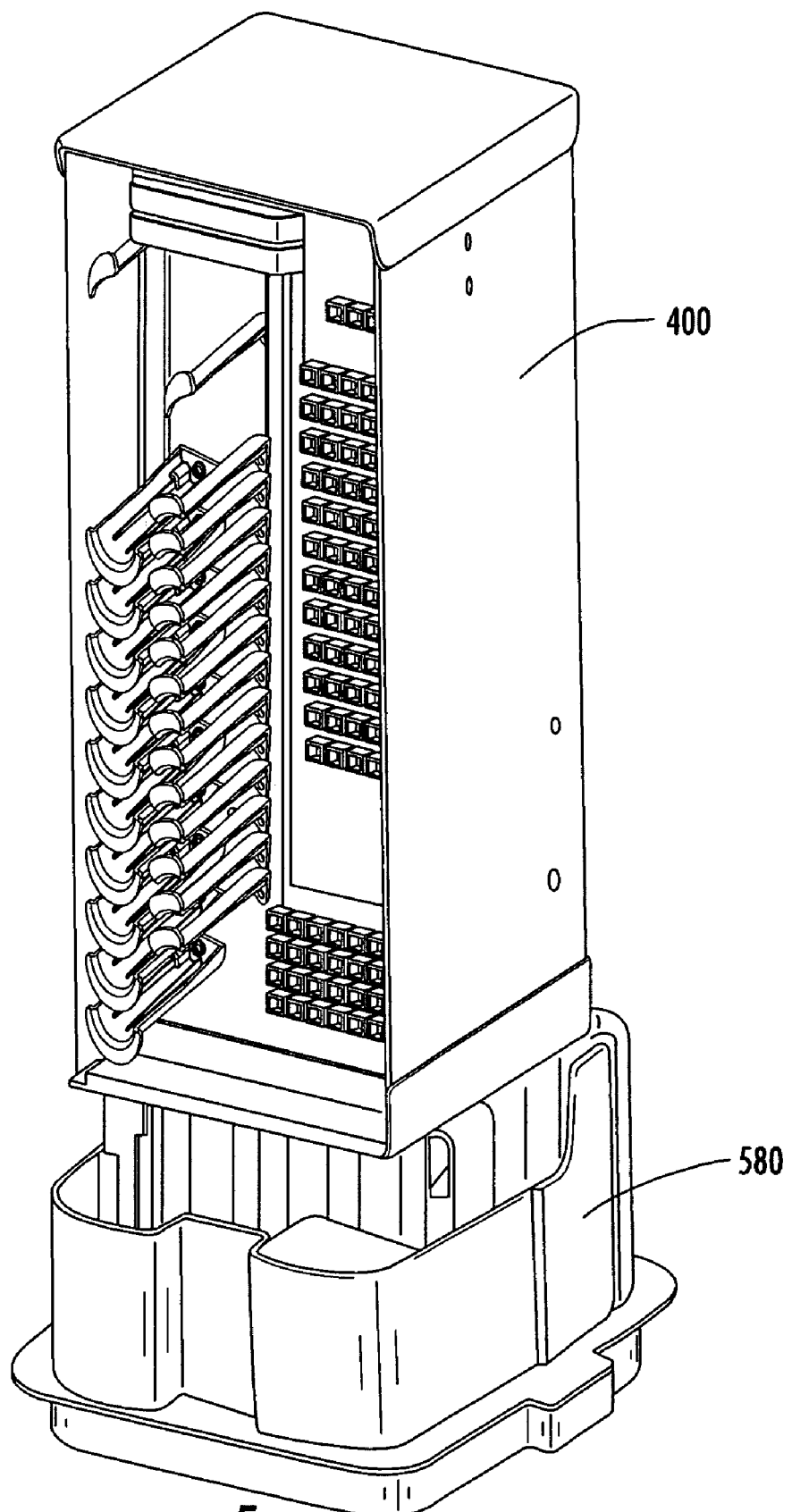

FIG. 5 is a perspective view of the fiber distribution hub of FIG. 4 with a base configured for a hand-hole mount.

Figure 1:
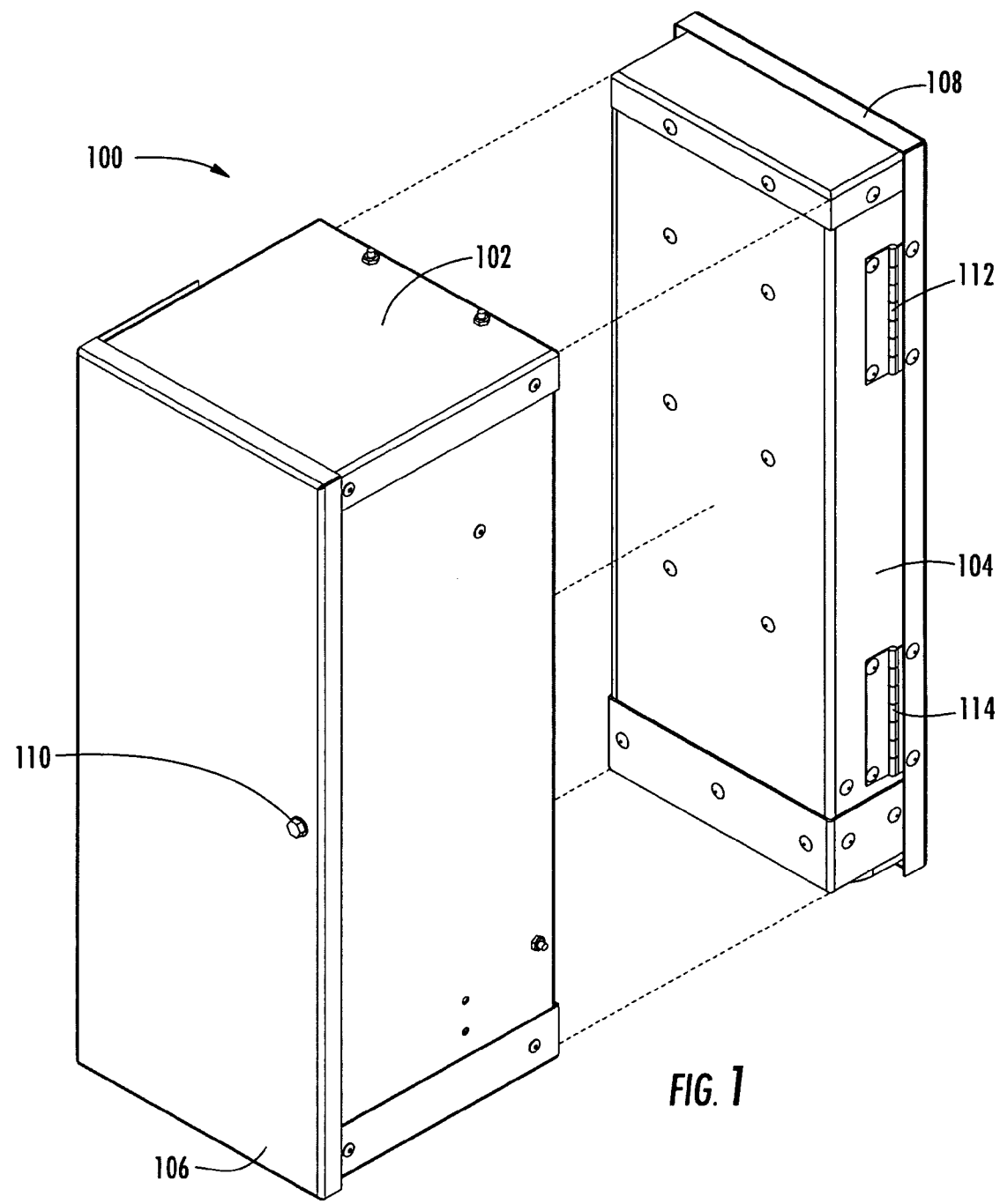
FIG. 1 is an exploded perspective view of a fiber distribution hub having a splice enclosure and a patch enclosure according to one embodiment of the present disclosure.
Figure 6:
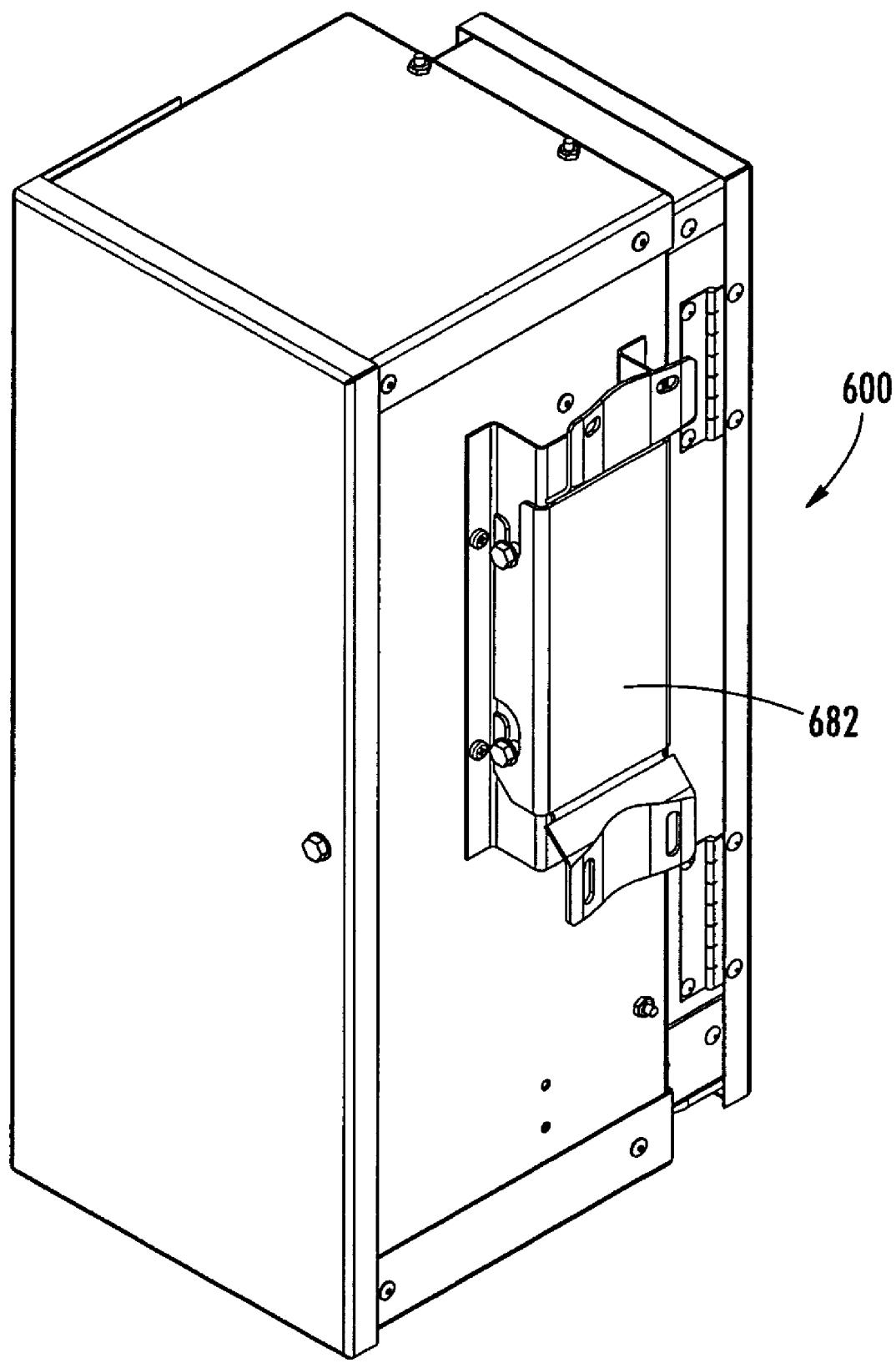

FIG. 6 is a perspective view of the fiber distribution hub of FIG. 1 when assembled with a mounting bracket configure for coupling a utility pole.

Figure 7:
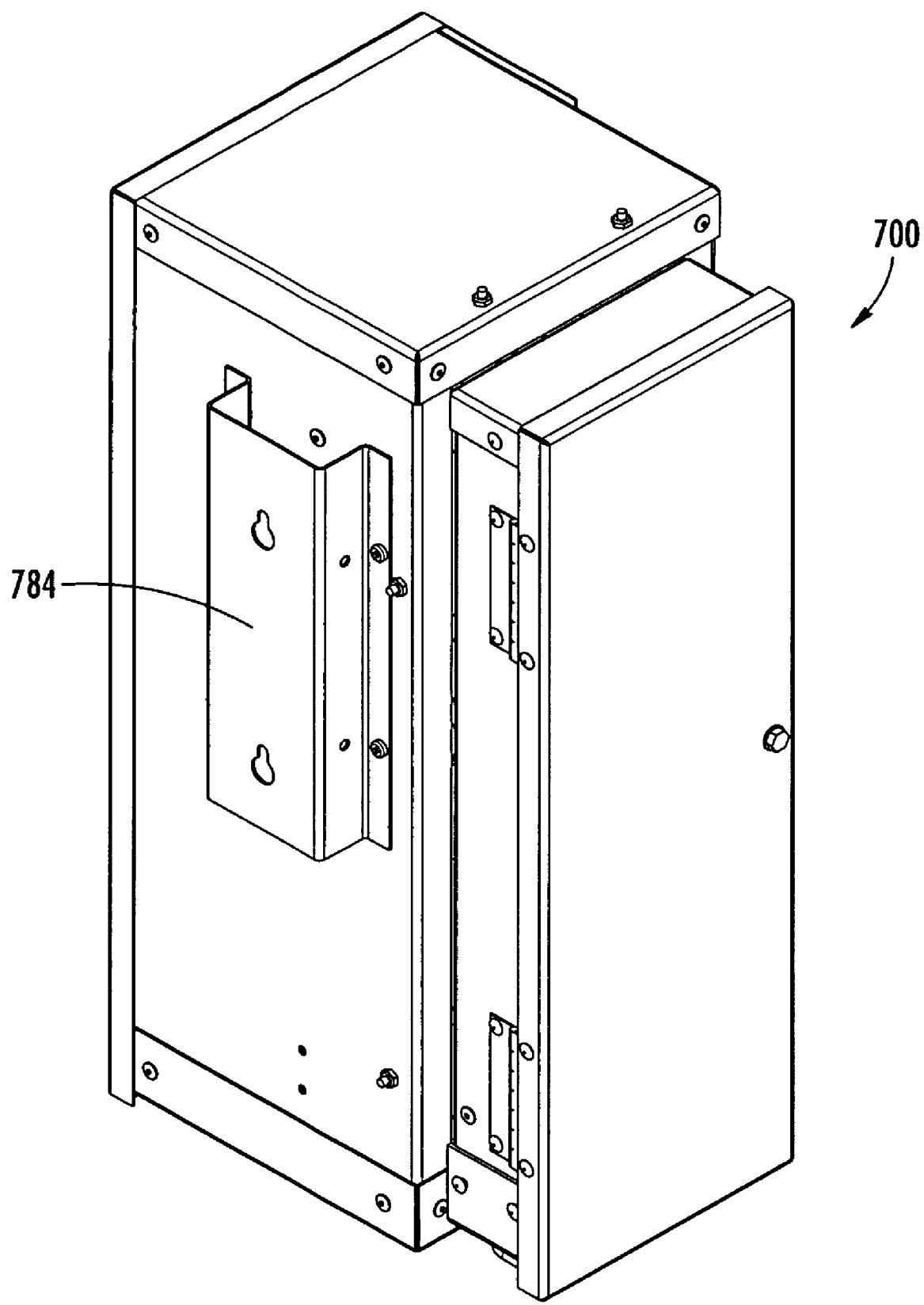

FIG. 7 is a perspective view of the fiber distribution hub of FIG. 1 when assembled with a mounting bracket configure for coupling a wall.

It should be understood that throughout the drawings, corresponding reference numerals indicate like or corresponding parts and features

DETAILED DESCRIPTION

The following description is merely exemplary in nature and is not intended to limit the present disclosure, its applications, or uses.

According to one aspect of the present disclosure, a method is provided for using a fiber distribution hub for distributing a fiber optic network. The fiber distribution hub includes a splice enclosure and a patch enclosure. The patch enclosure includes a door, and the patch enclosure defines a patch chamber. A mounting plate is positioned within the patch enclosure. The splice enclosure also includes a door. The method includes installing at least one optical fiber in the splice enclosure and releasably coupling the splice enclosure to the patch enclosure. In this manner, a technician can, if desired, remove the splice enclosure from the patch enclosure to service either one or both.

A fiber distribution hub according to one embodiment of the present disclosure is illustrated in FIG. 1 and indicated generally by reference numeral 100. While the fiber distribution hub 100 is suitable for carrying out the method described above, it should be understood the method described above is not limited to the fiber distribution hub 100.

As shown in FIG. 1, the fiber distribution hub 100 includes a patch enclosure 102 for housing a service termination to a customer premises and a splice enclosure 104 for protecting a splice connection between a feeder cable and an internal fiber cable. The patch enclosure 102 includes a door 106 and defines a patch chamber. The splice enclosure 104 includes a door 108 and defines a splice chamber. The splice enclosure 104 is configured to be releasably coupled to the patch enclosure 102.

The splice enclosure can be releasably coupled to the patch enclosure via one or more screws, bolts, nuts, rivets, spring-loaded captivated thumbscrews, quarter-turn fasteners, or other fasteners commonly known in the industry. Alternatively or additionally, the patch enclosure and the splice enclosure may include snap couplings, tab-slot pairs or other hardware-free connectors by which one enclosure can be attached onto the other enclosure. In the embodiment of FIG. 1, female hardware is integrally formed in the patch enclosure 102 such that bolts (not shown) passed through multiple openings in the splice enclosure 104 engage the female hardware to releasably couple the enclosures 102, 104. In other embodiments, male or female hardware can be integrally formed in a patch enclosure and/or a splice enclosure. In still other embodiments, a combination of hardware and hardware-free connectors may be employed to releasably couple a patch enclosure to a splice enclosure, or vice-versa.

In use, the splice enclosure 104 can be decoupled from the patch enclosure 102 to facilitate serving the splice enclosure to allow a technician to move the splice enclosure 104 to a work area for servicing the splice enclosure. The suitability of the area is often dictated by the tools available to the technician. For example, a "handheld" splice tool can be used in close proximity to the installation site, subject to environmental condition (such as dirt). When a handheld splice tool is available, the splice enclosure 104 can be simply moved to the ground or another area close to an installation site of the fiber distribution hub 100. Alternatively, when a large splice tool, such as a tool integrated in a splice truck, is available, the splice enclosure 104 can be independently moved a greater distance away from the installation site of the fiber distribution hub 100. The separable nature of the patch enclosure 102 and the splice enclosure 104 allows the splice enclosure 104 to be moved to the splice truck, while the patch enclosure 102 remains at the installation site. It should be appreciated that the splice enclosure 104 may also be decoupled from the patch enclosure 102 and transported independent of the patch enclosure 102.

The releasable coupling of the patch enclosure 102 and splice enclosure 104 further minimizes unnecessary component replacement caused when one or more components included in the fiber distribution hub 100 are damaged. For example, if a splice enclosure is damaged and a patch enclosure is not damaged, the splice enclosure can be decoupled from the patch enclosure and discarded. An existing feeder cable and corresponding optical fibers can be spliced or repositioned into a replacement splice enclosure, and the replacement splice enclosure can be coupled to the existing patch chamber. In this manner, the splice enclosure can be replaced independent of the patch enclosure, which results in cost savings.

As shown in FIG. 1, the patch enclosure and the splice enclosure include doors 106, 108. Due to a rubber gasket included inside each door (not shown), the doors 106, 108 form a weather-tight seal over the patch enclosure and the splice enclosure, respectively. The weather-tight seal provided by the doors 106, 108 allows use of lower-grade and less costly components and/or terminations within each enclosure. For example, the fiber distribution hub 100 can employ non-hardened terminations in some applications. Alternatively, hardened terminations may be employed within the fiber distribution hub 100 to meet more stringent specifications. One the other hand, the weather-tight seal and doors may be omitted from one or both, if desired.

Each of the patch enclosure and the splice enclosure is independently accessible via its respective door. For example, a technician can access the patch chamber via the door 106 included in patch enclosure 104 without accessing the splice chamber. Alternatively, a technician can access the splice chamber via the door 108 included in the splice enclosure 104 without accessing the patch chamber. With the ability to independently access each enclosure, craft separation between splice and patch operations is achieved. A technician performing a patch operation need not access the splice enclosure 104 and potentially disturb a splice connection contained therein. Although the door 106 is shown as secured via a bolt 110, it should be appreciated that a different or additional kind of fastener, such as a locking mechanism, can be used on the patch enclosure or the splice enclosure to limit access to those enclosures. For example, a splice enclosure can include a first locking mechanism, and a patch enclosure can include a second locking mechanism. If each locking mechanism employs a different key, splice technicians can be locked out of the patch enclosure, and patch technicians can be locked out of the splice enclosure.

As shown in FIG. 1, the splice enclosure includes hinges 112, 114, for coupling the door 106 to the enclosure. Alternatively, the door can be removably coupled to the splice enclosure 104 via connectors that permit the door to be quickly removed from and attached to the splice enclosure 104. The same applies to the patch enclosure door.

FIGS. 2A and 2B illustrate fiber distribution hub 200, which is the fiber distribution hub 100 assembled without the doors shown. The fiber distribution hub 200 includes a patch enclosure 202 and a splice enclosure 204, releasably coupled together. As shown in FIG. 2A, the patch enclosure 202 defines a patch chamber 216. The fiber distribution hub 200 also includes a mounting plate 218 positioned within the patch chamber 216. The mounting plate 218 includes various cable routing elements, e.g., guides and spools, to support and route the fiber cables included in the patch enclosure 202. An optical splitter 220 is supported by the mounting plate 218. The mounting plate 218 also supports various terminations between fibers exiting the optical splitter 220 and multiple drop cables. Each termination includes a temporary connection (e.g., pluggable) between one of the fibers exiting the optical splitter 220 and one of the multiple drop cables (as compared to a splice, which is a permanent connection between two optical fibers). As known to those skilled in the art, the support and routing of fiber cables is important to maintain the integrity of the fiber cables. The mounting plate 218 is moveable via a frame hinge (not shown) to adjust access to the various components, terminations, and optical splitter coupled to the mounting plate 218.

As shown in FIG. 2B, the splice enclosure defines a splice chamber 222. The splice enclosure includes a radius limiting spool 224 and a support bracket 226 for securing one or more splice trays (not shown). The radius limiting spool 224 is included for routing slack in various fiber cables positioned in the splice chamber. As its name suggests, the radius limiting spool 224 limits the bending radius of fiber cables positioned within the splice enclosure 204 to maintain the integrity of the fiber cables. Fiber cables enter and exit the splice chamber via access ports 228 along the bottom edge of the splice enclosure.

The fiber distribution hub 200 includes a height of about 23 inches, a width of about 9 inches, and a length of about 11 inches. Of course, the dimensions of the fiber distribution hub 200 may vary for any given application. For example, an intended installation environment, a desired capacity, and/or an anticipated number of terminations may be considered in determining dimensions of one or both of a patch enclosure and a splice enclosure included in a fiber distribution hub. The generally compact nature of the fiber distribution hub 200 provides for simplified mounting and installation as explained below.

FIGS. 3A thru 3C illustrate a fiber distribution hub 300, which is the same as fiber distribution hub 100, 200, but includes various fiber cables installed therein. The fiber distribution hub 300 includes a splice enclosure 302 and a patch enclosure 304. As shown in FIG. 3A, a feeder cable 330 is pulled into the splice enclosure 302 through access ports 332, 334. The feeder cable 330 is secured to the splice enclosure 302 by clamps 336, 338, which provide strain relief for the feeder cable 330. Slack in the feeder cable 330 is wound around a radius limiting spool 340.

The feeder cable 330 includes multiple optical fibers. In this particular embodiment, one of the optical fibers 342 in the feeder cable 330 is spliced to an optical fiber 344 included in an internal fiber cable 346. The remaining optical fibers within the feeder cable pass through the fiber distribution hub 300 and exit without being spliced. These "pass through" optical fibers included in the feeder cable may be spliced, for example, in a subsequent fiber distribution hub in the fiber network. The spliced connection between the optical fiber 342 of the feeder cable 330 and the optic fiber 344 of the internal fiber cable 346 is positioned within a removable splice tray 348, which is secured within the splice enclosure 302 via a support bracket 350. The internal fiber cable exits the splice enclosure at port 352. It should be appreciated that the number of spliced and "pass through" optical fibers in a feeder cable can vary for any given implementation of the fiber distribution hub 300.

As shown in FIG. 3B, the patch enclosure 304 includes a mounting plate 318 and an optical splitter 320. The mounting plate 318 supports multiple fiber terminations, including a field 354 and a parking lot 356. The field includes used fiber terminations, e.g., to a customer, one or more subsequent fiber distribution hubs, etc. The parking lot includes un-used fiber terminations. Although not visible, the internal fiber cable from the splice enclosure 302 enters the patch enclosure 304 and is coupled to an optical splitter 320. The optical splitter 320 divides a light signal carried by the internal fiber cable among split fiber cables (and provides bidirectional functionality). The optical splitter 320 feeds a plurality of split fiber cables from the internal fiber cable. Each of the split fiber cables includes an optical fiber. In this particular embodiment, the optical splitter 320 is a 1/32 splitter, which feeds 32 split fiber cables. In other embodiments, a different size or number of optical splitters can be used depending on the particular application. For example, one or more 1/4 splitters, 1/8 splitters, or 1/16 splitters can be included in a patch enclosure. Further, in other embodiments, an optical adapter may be used alternatively or in addition to an optical splitter. An optical adapter is a device for converting the optical signal provided by optical fiber to form other than an optical signal. For example, a fiber adapter can be employed to convert an optical signal carried by an optical fiber into an electrical signal to be carried by a copper wire, such as a coaxial cable. In another example, a fiber adapter can be employed to convert an optical signal carried by an optical fiber into a radio frequency signal that can be broadcast to a user or customer premises to provide service.

Referring again to FIG. 3B, each split fiber cable is terminated within the patch enclosure 304, either in the field 354 or in the parking lot 356. Each termination in the field 354 provides pluggable continuity between the feeder cable and a drop cable shown in FIG. 3C, which extends to a user premises, another fiber distribution hub, or other fiber distribution equipment, e.g., feed-thru and/or redundant equipment. The eight split fiber cables terminated in the parking lot 356 do not provide continuity to another fiber cable. The split fiber cables in the parking lot 356 are unused and available for future use. When a new customer requests service or other fiber distribution equipment (including a subsequent fiber distribution hub) is installed, one of the split fiber cables can be removed from the parking lot 356 and terminated appropriately in the field 354 to provide service to the customer or the other fiber distribution equipment. In the embodiment shown in FIG. 3B, the field includes seventy-two terminations to other fiber distribution equipment and two terminations 358 for direct customer access. It should be appreciated that the customer direct termination, the field, and the parking lot can include a different number of terminations in other embodiments of the fiber distribution hub. The particular number of fiber cables and terminations may depend on a particular fiber network in which a fiber distribution hub is employed. For example, a field may be expanded to include ninety-six, one hundred forty-four or even more (or less) terminations in some fiber distribution hubs.

FIG. 3C illustrates the mounting plate 318, which includes a front side 360 and a back side 362. The mounting plate is moveable such that the front side 360 and the back side 362 of the mounting plate 318 are accessible to a technician. Each cable extending from the back side 362 of the mounting plate 318 is a drop cable. The drop cables are routed via the radius limiting spools 364, 366. The drop cables exit the patch enclosure 304 and extend to a user premises, a subsequent fiber distribution hub or other fiber distribution equipment. When service is to be applied to the respective user premises, a subsequent fiber distribution hub, or other fiber distribution equipment, an optical fiber is plugged into the termination block in the field 354 on the front side 360 of the mounting plate 318 to create a termination between the optical fiber and the drop cable. In this manner, access to the front side 360 and back side 362 of the mounting plate 318 permits easy pluggable service beyond the fiber distribution hub 300. In this particular embodiment, the mounting plate 318 is mounted to a side wall of the patch enclosure, behind the door, which allows the door (not shown) and the mounting plate 318 to swing independently. In other embodiments, a different type of moveable mounting plate can be employed.

A fiber distribution hub can be employed in a FTTX network, e.g., fiber to the curb, fiber to the home, fiber to the premises, fiber to the node, etc. A plurality of fiber distribution hubs can be included in the fiber network. One or more feeder cables is supplied by a service provider to an initial fiber distribution hub, then on to one or more subsequent fiber distribution hubs according to the particular topology of the fiber network. The compact nature of the fiber distribution hubs disclosed herein allows the fiber network to be developed and expanded, one piece at a time to minimize initial capital investment to a region. For example, one fiber distribution hub can be installed for an emerging development. During the initial development, each building, home or office is connected to the fiber distribution hub. When the capacity of the initial fiber distribution hub is exceeded, a second fiber distribution hub can be added. As more buildings, homes, or offices are added to the development, additional fiber distribution hubs can be added as and when needed. Expanding the fiber network in this manner provides a scalable fiber network requiring a minimum initial investment.

Any fiber distribution hub constructed from the teaching of the present disclosure may be installed in various manners depending on various factors including environment and size constraints. FIG. 4 illustrates one embodiment of the fiber distribution hub 400 (same as the fiber distribution hub illustrated in FIGS. 1 thru 3) implemented in a pedestal enclosure 468. The fiber distribution hub includes a patch enclosure 402 including a door (not shown), a splice enclosure 404 including a door (not shown), and one or more mounting bracket 470. It should be appreciated that mounting bracket 470, and the mounting brackets described below, may be coupled to the splice enclosure in other embodiments of the present disclosure.

The fiber distribution hub 400 is installed in a pedestal enclosure 468 having a base 472 and a dome 474. Regardless of whether one or both doors form a weather-tight seal with its respective enclosures, the dome 474 provides further protection to components included in either the patch or splice enclosure from an outdoor environment in which the pedestal enclosure 402 is installed. In the embodiment of FIG. 4, the dome 474 is monolithically formed without any holes above the lock lower portion 476. Thus, the dome 474 is configured to provide a bell-jar effect to trap air in the dome 474 and protect the internal components from rising water during flood conditions. The additional protection of the dome 474 further hardens the enclosure against outdoor environmental conditions.

Alternatively, as shown in FIG. 5, a fiber distribution hub 500, generally the same as fiber distribution hub 400, including a mounting bracket 578 can be installed on a base 580 in combination with a plastic drum (not shown) in a hand-hole mount application. The plastic drum defines a chamber in which slack from a feeder cable can be stored. In some embodiments, the hand-hole application has an installed footprint of fifteen inches by fifteen inches. The footprint size provides a low-cost installation that may be completed manually. In still other embodiments, the fiber distribution hub 500 and the base 580 as shown in FIG. 5 can be used in a pad mount application.

In still other embodiments, a fiber distribution hub may be mounted without an additional enclosure. As shown in FIG. 6, a fiber distribution hub 600 includes mounting bracket 682. The mounting bracket 682 includes a generally arcuate shape for mounting to a cylindrical surface, such as a utility pole. As shown in FIG. 7, a fiber distribution hub 700 includes a mounting bracket 784. The mounting bracket 784 includes a generally flat shape for mounting to a flat surface such as a wall. It should be appreciated that other shapes and sizes of mounting brackets can be employed in other embodiments of the present disclosure to conform to a particular installation site. In the embodiments of FIGS. 6 and 7, an additional enclosure may be mounted adjacent to a fiber distribution hub to store slack in a feeder cable. Regardless of whether a fiber distribution hub is installed completely within an enclosure, e.g., as pedestal enclosure, one or more doors included in a fiber distribution hub may include a locking mechanism for security.

Although several aspects of the present disclosure have been described above with reference to fiber distribution, it should be understood that various aspects of the present disclosure are not limited to fiber distribution, and can be applied to a variety of other telecommunication distribution systems.

By implementing any or all of the teachings described above, a number of benefits and advantages can be attained including improved system reliability, reduced utility down time, elimination or reduction of redundant components or systems, avoiding unnecessary or premature replacement of components or systems, and a reduction in overall system and operating costs.

What is claimed is:

1. A pedestal enclosure comprising a base, a dome, and a fiber distribution hub for distributing a fiber optic network, the fiber distribution hub including a mounting plate for supporting a termination of at least one fiber cable, a patch enclosure for protecting the termination, and a splice enclosure for protecting at least one splice connection to an optical fiber included in a feeder cable, the patch enclosure including a first door and defining a patch chamber, the mounting plate positioned within the patch chamber, the splice enclosure including a second door, the splice enclosure releasably coupled to the patch enclosure, the first door and the second door disposed on opposite sides of the fiber distribution hub when the splice enclosure is coupled to the patch enclosure, each of the patch enclosure and the splice enclosure being independently accessible with respect to one another.

2. The pedestal enclosure of claim 1 wherein the mounting plate includes a front side and a back side, the mounting plate being moveable relative to said patch enclosure to provide access to the front and back side of the mounting plate.

3. The pedestal enclosure of claim 2 further comprising a fiber optic splitter coupled to the mounting plate for splitting throughput available via the optical fiber included in the feeder cable.

4. The pedestal enclosure of claim 1 wherein a splice chamber defined by the splice enclosure is accessible to a technician only via the second door.

5. The pedestal enclosure of claim 1 wherein the dome includes a lower lock portion, and wherein the dome is configured to provide a bell-jar effect to trap air in the dome and protect components in the dome from rising water during flood conditions.

6. The pedestal enclosure of claim 1 wherein the first door forms a weather-tight seal when in a closed position, and wherein the second door forms a weather-tight seal when in a closed position.

7. A pedestal enclosure comprising a base, a dome and a fiber distribution hub supported by the base, the fiber distribution hub including a mounting plate for supporting a termination of at least one fiber cable, a patch enclosure for protecting the termination, and a splice enclosure for protecting at least one splice connection to an optical fiber included in a feeder cable, the patch enclosure including a first door and defining a patch chamber, the mounting plate positioned within the patch chamber, the splice enclosure including a second door, the splice enclosure releasably coupled to the patch enclosure, each of the patch enclosure and the splice enclosure being independently accessible with respect to one another.

8. The pedestal enclosure of claim 7 wherein the first door includes a first gasket for forming a weather-tight seal when the first door is in a closed position and the second door includes a second gasket for forming a weather-tight seal when the second door is in a closed position.

9. The pedestal enclosure of claim 7 wherein the mounting plate is moveable relative to said patch enclosure to provide access to a front side and a back side of the mounting plate.

10. The pedestal enclosure of claim 7 wherein the fiber distribution hub includes at least one fiber optic splitter having multiple split fiber cables and disposed within the patch chamber.

11. The pedestal enclosure of claim 10 wherein the fiber distribution hub includes a field for terminating at least one of the split fiber cables and a parking lot for terminating at least one of the split fiber cables, each of the field and the parking lot supported by the mounting plate.

12. The pedestal enclosure of claim 7 wherein the splice enclosure includes a locking mechanism such that a technician can access the patch enclosure but not access the splice enclosure.

13. The pedestal enclosure of claim 7 wherein the mounting plate includes an optical adapter coupled to the mounting plate, the optical adapter configured to convert an optical signal transferred via the optical fiber included in the feeder cable into one of an electrical signal and a radio frequency signal.

* * * * *